W. L. HOFER.
MUSICAL GAME.
APPLICATION FILED MAR. 31, 1916.

1,189,450.

Patented July 4, 1916.

Inventor,
William Leonard Hofer

Witnesses

UNITED STATES PATENT OFFICE.

WILLIAM LEONARD HOFER, OF MANHATTAN, KANSAS.

MUSICAL GAME.

1,189,450.  Specification of Letters Patent.  Patented July 4, 1916.

Application filed March 31, 1916. Serial No. 88,045.

*To all whom it may concern:*

Be it known that I, WILLIAM LEONARD HOFER, of Manhattan, Kansas, a citizen of the United States of America, have invented a new and useful Improvement in Musical Games, of which the following is a specification.

This invention is intended to combine teaching the names of the notes in both treble and bass clefs and the values of the various notes and rests with an interesting game.

Figure 3:
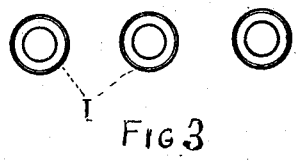
Figure 2:
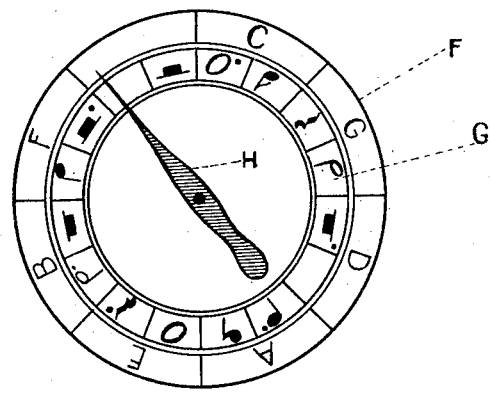
Figure 1:
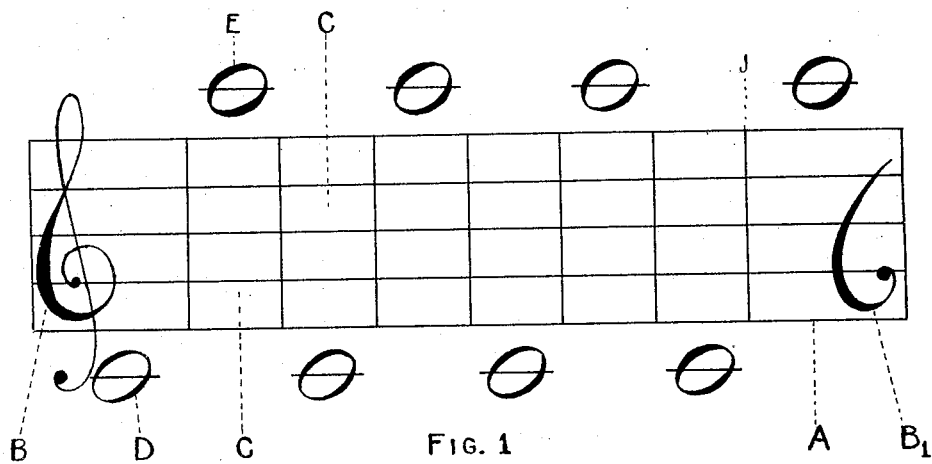

Referring to the drawing, Figure 1 is a plan view of the design over which the playing pieces are moved. Fig. 2 is a plan view of a chance device for determining the moves of the game and Fig. 3 shows the playing pieces or men used in the game.

The staff A, shown in Fig. 1 is printed, stamped or otherwise marked on a base of cardboard or other suitable material. It has a treble clef B at the beginning and may also have an inverted bass clef at its opposite end. Below the staff A, in the first measure, is a note D, preferably on the first added line, this note being repeated in alternate measures into which the staff is divided by means of the bars. In each of the intermediate measures a similar note E is placed above the staff.

Fig. 2 shows a circular arrangement of the seven note names F, preferably arranged in fifths, which occupy equi-distant places in the circle, one space, however, may be left blank in order to make an even number of divisions of the circle. A second circle G, concentric with the above may also be added, in which notes and rests of various values are marked. In this several places may be left blank to avoid duplication of notes and rests and also to make an even number of spaces. A pointer H, adapted to spin, is secured to the center of the circles to determine the distances the men are to be moved along in their pathway on the staff A. The circular arrangement of note names and notes and rests with the spinner need not necessarily be on the same board with the staff A, but can be on a separate base if desired.

A number of playing pieces or men I, are provided, which are to be moved up and down in the successive measures of the staff A, as hereinafter explained.

Two, three or four persons may play this game, each taking one or more men. When four play, they may play in partnership, two against two. In this case, both partners must move their men to the goal to win. To play the principal game, which is intended to teach the names of the notes, and which may be designated as game I, one of the players places a man on the first note below the staff on the left; then spins the pointer and moves his man upward to the nearest line or space in the measure corresponding to the letter indicated by the pointer H. If the pointer stopped on G, he moves his man to the second line—the line on which G is written; if on A, to the second space, etc. The next player now follows in like manner, the men moving upward to the first space above the staff; then across to the note above in the second measure; down in the second measure to the first space below; then over to the note below in the third measure, always going up in one measure and down in the next until the note above in the last measure is reached, the player, or players, if playing as partners, first placing his man, or men, if more than one is used, being the winner. The play to win must be just enough to take the man to the goal; if greater, the man can not be moved until his next regular turn.

When a player places his man on a line or space already taken by another, the latter must move his man back to the last note, above or below, passed, which is not occupied. In case all such are taken, he must go back to the starting place to begin anew at his next turn. The notes above and below, are starting, ending and safety places and a man on one of these can not be displaced; hence any play which would take a man to one already occupied does not count, the player losing his turn. The treble and bass clefs are placed on opposite ends of the staff A, one being reversed, so that by turning the board, either may be used, the notes being read according to the clef which stands at the left, or beginning of the staff.

To play game II, which is intended to teach note values, start and play as before, but move the men forward according to the number of eighths contained in the note or rest indicated by the pointer in the second circle G, moving one degree for every eighth—a degree being the distance from a line to the space adjacent, or vice versa—from one letter to the next. The game may be varied.

Having thus described my invention, what I claim as new and of my own invention is—

1. In a musical game, a staff having a clef at the beginning; the staff divided into a number of measures; a note below the staff in alternate measures, beginning with the first, and a similar note above the staff in the intervening measures; pieces to be moved up and down the staff and means to determine the distances to be moved.

2. In a musical game, a staff having a clef at each end, one being reversed; the staff divided into a number of measures; a note below the staff in alternate measures, beginning with the first, and a similar note above the staff in the intervening measures; pieces to be moved up and down the staff and means to determine the distances to be moved.

3. In a musical game, a staff divided into a number of measures; a note on the first added line below the staff in alternate measures, beginning with the first, and a similar note on the first added line above in the intervening measures; a clef at the beginning of the staff, and a spinning pointer attached to the center of a circular arrangement of the seven-note names of the scale, substantially as shown and described.

4. In a musical game, a staff divided into a number of measures, a note on the first added line below the staff in alternate measures, beginning with the first, and a similar note on the first added line above in the intervening measures; a clef at the beginning of the staff; the seven note names of the scale arranged in circular form; a circular arrangement of notes and rests of different values, placed concentrically with the note names, and a spinning pointer turning on the center of the circles, substantially as shown and described.

In testimony whereof I sign the foregoing specification in the presence of two witnesses.

WILLIAM LEONARD HOFER.

Witnesses:
K. W. HOFER,
GEO. J. LUEBBE.

Copies of this patent may be obtained for five cents each, by addressing the "Commissioner of Patents Washington, D. C."